United States Patent [19]

Ishikawa et al.

[11] Patent Number: 4,649,060
[45] Date of Patent: Mar. 10, 1987

[54] METHOD OF PRODUCING A PREFORM WIRE, SHEET OR TAPE FIBER REINFORCED METAL COMPOSITE

[75] Inventors: Toshikatsu Ishikawa, Tokyo; Haruo Teranishi, Machida; Yoshikazu Imai, Tokyo; Yoichi Nagata, Yokohama, all of Japan

[73] Assignee: Agency of Industrial Science & Technology, Tokyo, Japan

[21] Appl. No.: 712,118

[22] Filed: Mar. 15, 1985

[30] Foreign Application Priority Data

Mar. 22, 1984 [JP] Japan ............................ 59-53542

[51] Int. Cl.⁴ .............................................. B05D 3/12
[52] U.S. Cl. ............................. 427/57; 427/251; 427/404; 427/424; 427/427
[58] Field of Search ............. 427/57, 251, 404, 424, 427/427

*Primary Examiner*—Bernard D. Pianalto
*Attorney, Agent, or Firm*—Stevens, Davis, Miller & Mosher

[57] ABSTRACT

A preform wire for fiber reinforced metal consisting of a metal/silicon carbide fiber composite material is light in weight and excellent in strength and elasticity, and can be easily obtained by impregnating a silicon carbide fiber bundle with a molten metal which is kept vibrated by means of an ultrasonic wave vibration apparatus having a cooling means.

5 Claims, 2 Drawing Figures

METHOD OF PRODUCING A PREFORM WIRE, SHEET OR TAPE FIBER REINFORCED METAL COMPOSITE

BACKGROUND OF THE INVENTION

(1) Field of the Invention

The present invention relates to a method of producing a preform wire fiber reinforced metal composite and an ultrasonic wave vibration apparatus used in the method. More particularly, the present invention relates to a method of producing a light, elastic and strong preform wire fiber reinforced metal composite, which wire is a silicon carbide fiber/metal composite material consisting of silicon carbide fibers and a metal fully penetrated between the fibers, and has no vacant space between the fibers; and an ultrasonic wave vibration apparatus which can vibrate efficiently a molten metal used in the method.

The term "preform wire fiber reinforced metal composite" used in the present invention includes not only preform wire fiber reinforced metal composite, but also preform sheet or tape fiber reinforced metal composite.

(2) Description of the Prior Art

A composite material consisting of a fibrous material, such as silicon carbide fiber or the like, impregnated with a metal, such as aluminum or the like, has excellent properties of both the metal and the fiber, and is tough, light and flexible. Therefore, the composite material is expected to be widely used as a material for vehicle, aircraft, rocket, spaceship and other various articles.

The have been proposed various methods in the production of the metal/fiber composite material. For example, there is known a method, such as plasma jet, metalikon or vapor deposition, wherein metal fine particle or metal vapor is blown against a fiber bundle to adhere the metal to the fiber surface and to produce a metal/fiber composite material or its precursor. However, in these methods, metal fine particle or metal vapor is straight blown to a fiber bundle, and therefor these methods have a drawback that the metal is not fully penetrated into the interior of the fiber bundle, and a composite material having satisfactorily high strength and elasticity can not be obtained.

Further, there has been proposed a method, wherein a fiber bundle is immersed in a molten metal bath and at the same time an ultrasonic wave vibration is given to the molten metal bath in order to penetrate the molten metal into the interior of the fiber bundle. In this method, the fiber bundle is unwoven by the ultrasonic wave vibration, and air contained in the interior of the fiber bundle is exhausted, and hence metal is fully penetrated into the interior of the fiber bundle, but the fibers are fixed in a randomly unwoven state by the vibration. Accordingly, it is difficult to produce in this method a metal/fiber composite material having desired strength and elasticity. Further, when an ultrasonic wave vibration apparatus is used, the vibrator cracks with the lapse of time from the wall forming the hole, which is formed in order to pass therethrough a water for cooling the horn of the vibrator, and hence the vibration is not transmitted to the horn end portion which is kept immersed in the molten metal bath.

As described above, there have not been known a method of producing a metal/fiber composite material which is light in weight and is excellent in strength and elasticity, nor an ultrasonic wave vibration apparatus to be advantageously used for the method.

The present invention aims to solve the above described problems and to provide a metal/fiber composite material, particularly a preform wire fiber reinforced metal composite, which consists of a metal, such as aluminum or the like, and silicon carbide fiber, and is lighter in weight and is more excellent in strength and elasticity than conventional metal/fiber composite materials, and to provide an ultrasonic wave vibration apparatus to be used in the method.

The inventors have made various investigations in order to attain the above described object, and found out that, when a silicon carbide fiber bundle is previously drawn such that the element fibers constituting the fiber bundle are uniformly arranged in a parallel relation along their length direction, is occasionally sprayed or deposited with a metal, such as aluminum or the like, and then the fiber bundle is immersed in a molten metal bath which is kept vibrated by means of an ultrasonic wave vibration apparatus, an excellent preform wire fiber reinforced metal composite can be obtained. The inventors have further found out that, in order to protect an ultrasonic wave vibration apparatus used in the above described method from high temperature, when a hole for cooling water is formed in the horn of the vibrator, or a water-cooling jacket is arranged on the horn of the vibrator, at the upper portion, which is not immersed in the molten metal bath, and at the position corresponding to the node of the half-wavelength of the ultrasonic wave, a metal/fiber composite material having a stable property over a long period of time and being free from cracks in the horn during the use can be obtained. As the result, the inventors have reached the present invention.

SUMMARY OF THE INVENTION

One of the features of the present invention lies in a method of producing a preform wire fiber reinforced metal composite, comprising unfastening and drawing a silicon carbide fiber bundle such that the element fibers constituting the fiber bundle are uniformly arranged in a parallel relation along their length direction, and impregnating the fiber bundle for a period of time of not longer than 50 seconds with a molten metal, which is kept vibrated by means of an ultrasonic wave vibration apparatus having a cooling means.

Another feature of the present invention lies in an ultrasonic wave vibration apparatus, comprising a vibrator and an ultrasonic wave oscillator, said vibrator acting to vibrate a molten metal to be used for impregnating a silicon carbide fiber bundle in the production of a preformed wire fiber reinforced metal composite, said vibrator comprising a horn having a hole for cooling water or having a water cooling jacket at its upper portion and at a position corresponding to the node of the half-wavelength of the ultrasonic wave.

DESCRIPTION OF THE PREFERRED EMBODIMENT

The method of producing a preform wire for FRM according to the present invention is characterized in that a silicon carbide fiber bundle is unfastened and drawn such that the element fibers constituting the fiber bundle are uniformly arranged in a parallel relation along their length direction, and then the fiber bundle is impregnated with a molten metal, which is kept vibrated means of an ultrasonic wave vibration apparatus having a cooling means, for a period of time of not longer than 50 seconds, preferably not longer than 2 seconds. In the metal/silicon carbide fiber composite material obtained by this method, metal is fully penetrated between the element fibers and there is no vacant spaces between the fibers. In the method of the present invention, the unfastened and drawn silicon carbide fiber bundle may be previously sprayed with or vapor deposited with a metal, and then the thus treated unfastened and drawn silicon carbide fiber bundle may be impregnated with a molten metal while vibrating the molten metal by means of an ultrasonic wave. The metal to be used in this spraying or vapor deposition may be same with or different from the metal to be used for impregnation in the form of a molten metal. Further, the fiber bundle may be electromagnetically vibrated during the impregnation. The preform wire for FRM obtained in the above described method is light in weight and is excellent in strength, elasticity and other properties.

The ultrasonic wave vibration apparatus of the present invention is characterized in that the apparatus comprises a vibrator and an ultrasonic wave oscillator, which vibrator acts to vibrate a molten metal to be used for impregnating a starting silicon carbide fiber bundle for the production of a preform wire fiber reinforced metal composite, and comprises a horn having a hole for cooling water or having a water-cooling jacket at its upper portion and at a position corresponding to the node of the half-wavelength of the ultrasonic wave. The ultrasonic wave vibration apparatus having the above described structure protects the vibrator from high temperature and can eliminate drawbacks of conventional ultrasonic wave vibration apparatus that cracks are caused in the horn during the use for a long period of time to disturb the transmittance of vibration to the horn end portion immersed in the molten metal bath.

The present invention will be explained in more detail referring to the accompanying drawings.

Figure 1:
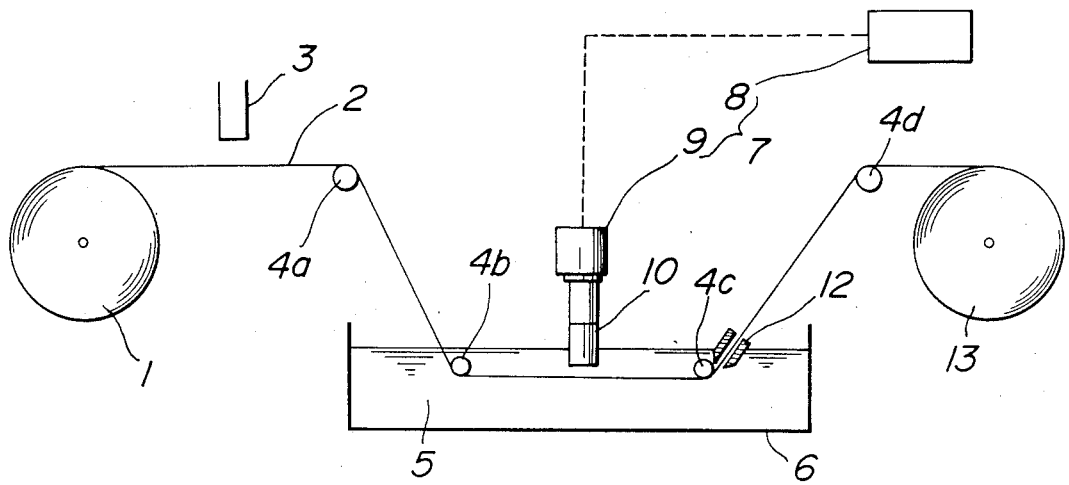
FIG. 1 is a diagrammatic view of a flow sheet illustrating one embodiment of the method of producing a preform wire for FRM according to the present invention.
Figure 2:
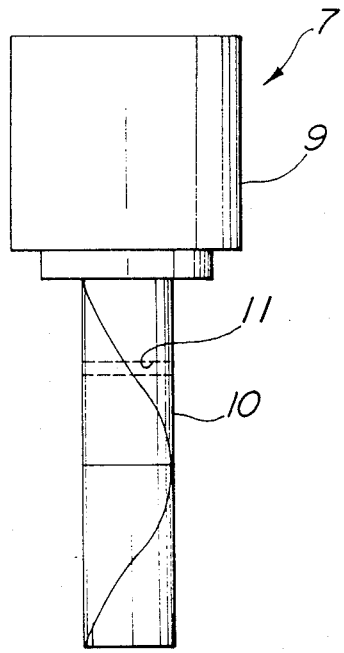
FIG. 2 is a diagrammatic view illustrating the vibrator portion of the ultrasonic wave vibration apparatus according to the present invention.

FIG. 1 is a diagrammatic view of a flow sheet illustrating one embodiment of the method of producing a preform wire for FRM according to the present invention; and FIG. 2 is a diagrammatic view illustrating the vibrator portion of the ultrasonic wave vibration apparatus according to the present invention.

Referring to FIG. 1, a silicon carbide fiber bundle 2 is unfastened and drawn by means of a fiber bundletensioning apparatus 1 such that the element fibers constituting the fiber bundle 2 are uniformly arranged in a parallel relation along their length direction, and then the fiber bundle 2 is sprayed with a molten metal, such as molten aluminum or the like, by means of a metal-spraying apparatus 3, such as plasma jet, metalikon or the like, to fix in a parallel relation the element fibers of the silicon carbide fiber bundle 2. In the present invention, not only the metal-spraying apparatus 3, but also any means, such as vacuum deposition and the like, which can adhere a metal to the silicon carbide fiber bundle 2 to fix in a parallel relation the element fibers, can be used. In the present invention, the step for spraying or vapor depositing a metal to a silicon carbide fiber bundle can be omitted.

The silicon carbide fiber bundle 2 adhered with the metal is passed through guide rolls 4a and 4b, and introduced into a vessel 6 filled with a molten metal 5, such as molten aluminum or the like, and impregnated with the molten metal 5 in the vessel 6. During the course of the impregnation of the silicon carbide fiber bundle 2 with the molten metal 5, an electromagnetic vibration may be given to the silicon carbide fiber bundle 2 between the guide rolls 4a and 4b. The metals to be used for the impregnation include aluminum, magnesium, titanium, lead, silicon and the like, and their alloys.

The molten metal 5 is vibrated by means of an ultrasonic wave vibration apparatus 7. This ultrasonic wave vibration apparatus 7 comprises an oscillator 8 and a vibrator 9. The lower portion of the horn 10 of the vibrator 7 is immersed in a molten metal 5 filled in a vessel 6. The horn 10 of the vibrator 9 vibrates the molten metal 5 corresponding to the signal transmitted from the oscillator 8. As illustrated in FIG. 2, it is necessary that the horn 10 has at its upper portion a hole 11 for cooling water or a water-cooling jacket 11 in order not to transmit the heat of the molten metal 5 to the vibrator 9. The hole 11 for cooling water or the water-cooling jacket 11 must be formed or arranged respectively at a position corresponding to the node of the half-wavelength of the ultrasonic wave. When a hole 11 for cooling water is formed or a water-cooling jacket 11 is arranged at this position, cracks do not occur from the horn portion even when an ultrasonic wave treatment is effected for a long period of time, and the drawbacks in a conventional ultrasonic wave vibration apparatus can be eliminated. The relation between the length L of the horn 10 and the frequency is represented by the following formula (1)

$$C_t = L \times f \tag{1}$$

in the formula (1), $C_t$ : sonic velocity in the horn at the molten metal temperature L : horn length f : frequency.

In the present invention, it is necessary that the metal adhered to the surface of the silicon carbide fiber bundle 2 is melted at a position just beneath the horn 10 arranged in the molten metal vessel 6. When the adhered metal is melted before the metal reaches just beneath the horn 10 in the vessel 6, the effect of previously fixing the a parallel relation the element fibers of the silicon carbide fiber bundle 2 is extinguished. On the contrary, when the adhered metal does not melt even when the metal come to just beneath the horn 10, the metal can not be fully penetrated into the interior of the silicon carbide fiber bundle 2 even in the case where the fiber bundle is subjected to an ultrasonic wave treatment. When these phenomena are taken into consideration, the molten metal bath temperature in the vessel 6 is preferably 20°–100° C. higher than the melting temperature of the metal. For example, when aluminum is used as a metal, the bath temperature is preferably about 680°–760° C. The immersing time of the silicon carbide fiber bundle 2 in a molten metal bath must be not longer than 50 seconds, and is preferably not longer than 2 seconds, particularly preferably not longer than 1 second.

The vibration by the ultrasonic wave vibration apparatus 7 is controlled by selecting properly the resonance frequency. In general, a frequency of 19–20 KHz is used.

In the ultrasonic wave vibration apparatus 7 of the present invention, it is necessary that the raw material for the horn 10 is properly selected. That is, the horn 10 is consumed in a molten metal 5, and therefore there are used metals having a high resistance against consumption, for example, stainless steel, nickel alloy, molybdenum, tungsten, titanium, ceramics and the like. In general, the use of two horns 10 connected in parallel exhibits the highest vibration efficiency. However, when 3 or more horns are connected in parallel, the vibration efficiency decreases somewhat. The cross-sectional shape of the horn 10 is optional, and circular, rectangular, horseshoe-shaped cross-sectional shapes and the like are used.

In the silicon carbide fiber bundle 2, which has been impregnated with a molten metal, such as molten aluminum or the like, and concurrently subjected to an ultrasonic wave treatment under such an unfastened and drawn state that the element fibers are uniformly arranged in a parallel relation along their length direction, the metal, such as aluminum or the like, is fully penetrated between the element fibers, and the vacant is very little between the fibers.

The above treated silicon carbide fiber bundle 2 is continuously passed through guide rolls 4c and 4d, and a slit 12 or dies to be formed into a desired shape, and excess metal is squeezed to form a preform wire containing a given amount by volume of fiber, and the preform wire is taken up, for example, on a take-up roll 13. In the present invention, an explanation has been made with respect to the preform wire. However, the term "preform wire" used in the present invention means not only preform wire but also preform sheet or tape as described above.

The following example is given for the purpose of illustration of this invention, and is not intended as a limitation thereof.

EXAMPLE

According to the steps shown in FIG. 1, a silicon carbide fiber bundle consisting of 500 element fibers was unfastened and drawn such that the element fibers constituting the fiber bundle were arranged in a parallel relation along their length direction, and then the fiber bundle was sprayed with aluminum by means of a plasma jet to adhere the aluminum to the surface of the silicon carbide fiber bundle. Thereafter, the silicon carbide fiber bundle containing aluminum adhered thereto was continuously passed in an aluminum bath kept at 720° C. through guide rolls, and was concurrently subjected to an ultrasonic wave treatment, wherein the resonance frequency of the ultrasonic wave vibration apparatus was kept to about 20 KHz and the impregnation time of the silicon carbide fiber bundle with aluminum in the bath was kept to about one second.

The aluminum-impregnated silicon carbide fiber bundle was passed through a slit and guide rolls to be formed into a desired shape, excess aluminum was squeezed and then the above treated fiber bundle was taken up on a take-up roll to obtain an aluminum preform wire fiber reinforced metal composite. In the resulting aluminum preform wire fiber reinforced metal composite, the fibers occupied 30% by volume based on the total volume of the preform wire, and the metal was fully penetrated between the element fibers, and there was no vacant spaces between the fibers. The observed value of the tensile strength of the preform wire was 65 kg/mm$^2$ (theoretical value: 80 kg/mm$^2$). Further, it was ascertained that the arrangement of the element fibers was not disordered. In order to examine the strength of the silicon carbide fiber bundle in this aluminum preform wire for FRM, aluminum contained in the preform wire was chemically dissolved and removed, and the remaining silicon carbide fiber bundle was taken out. When the tensile strength of the silicon carbide fiber bundle was measured, there was no difference in the strength before and after the treatment. That is, it was ascertained that the deterioration of the fibers due to their reaction with metal did not occur.

What is claimed is:

1. A method of producing a preform wire, sheet or tape fiber reinforced metal composite, comprising unfastening and drawing a silicon carbide fiber bundle such that the element fibers constituting the fiber bundle are uniformly arranged in a parallel relation along their length direction, and impregnating the fiber bundle for a period of time of not longer than 50 seconds with a molten metal, while ultrasonically vibrating the fiber bundle.

2. A method according to claim 1, wherein a metal is previously sprayed or vapor deposited on the silicon carbide fiber bundle before the impregnation.

3. A method according to claim 2, wherein the metal is one member selected from the group consisting of aluminum, magnesium, silicon, titanium, lead, copper and their alloys.

4. A method according to claim 1, wherein the metal is one member selected from the group consisting of aluminum, magnesium, silicon, titanium, lead, copper and their alloys.

5. A method according to claim 1, wherein the impregnation time is not longer than 2 seconds.

* * * * *